Patented Dec. 13, 1938

2,139,836

UNITED STATES PATENT OFFICE 2,139,836

FROZEN CONFECTION AND PROCESS FOR MAKING SAME

Aaron London, Brooklyn, N. Y.

No Drawing. Application March 9, 1937,
Serial No. 129,840

3 Claims. (Cl. 99—136)

This invention relates to new and useful improvements in the preparation of ice cream, and other frozen confections, and to the products resulting therefrom.

Ice cream, particularly, is subject to various defects resulting from various deficiencies inherent or acquired. Unless various extraneous and otherwise unnecessary substances such as gelatin, or gums, are added to the mix, smooth freezing and a non-crystalline products is difficult of attainment and commercially impractical.

Ice cream has the tendency to become sandy or gritty due to crystallization of the freeze. The flavors incorporated in the ice cream are liable to streaking or uneven distribution, decomposition, spoilage, rancidification or the like.

The addition of fruits has heretofore been difficult, it being necessary to add the fruits to the semi-frozen mix and not to the original mix, the fruit otherwise being practically destroyed by the processing; also, many fruits are not amenable to freezing, many spoiling and losing their flavor.

In the manufacture, distribution, and transportation of ice cream, spoilage is frequent, and excessive precautions have been necessary to prevent bacteriological spoilage or contamination.

Heretofore, when ice cream already packaged melted while in transit or storage, the increased bacterial content and activity had no retarding or controlling factor.

I have found, however, that by adding ethyl alcohol (grain or cane alcohol, whiskey, wine, brandy, rum, cordials or similar alcoholic beverages in sufficient quantity), I obtain an ice cream or similar frozen article, or pudding, or the like, that is free from the aforementioned defects either in entirety or in part.

The addition to ice cream mixes of ethyl alcohol in the form of spirituous beverage liquors, such as whiskey, gin, and various cordials, has previously been attempted, but has always met with failure, it having been found that such liquors tend to separate ice crystals. In these previous attempts, crystals appeared and graininess or sandiness resulted, and hence it necessitated the addition of large amounts of stabilizers in order to prevent the emulsions from breaking down during freezing. Ice cream, being a perishable food stuff, is readily attacked by bacteria and is easily spoiled.

An important object of this invention is to prepare an ice cream mix containing spirituous liquors which do not separate ice crystals on freezing and do not necessitate the addition of large amounts of stabilizers.

A further object of the invention is to prepare an ice cream or frozen confection which is resistant to spoilage and in which bacterial action is inhibited.

A further object of the invention is to prepare a frozen confection in which the flavor is evenly distributed and more lasting.

A further object of the invention is to prepare a frozen confection that does not readily adhere to molds or containers.

Further objects of this invention will be evident from further reading of this specification.

I have found that by the addition of alcohol, preferably in the form of spirituous liquors such as whiskey, rum, gin, brandy, or cordials, in amounts such that the final product contains approximately (10 proof) 5% by volume or greater of ethyl alcohol, I obtain a frozen confection having all the advantages stated under the objects of this invention. This limiting value of 5% is not a well defined value but will vary depending upon the particular frozen confection formula used. However, there is generally a limiting value below which one obtains a grainy or sandy ice cream containing many ice crystals and if the alcohol content is above this limiting value a smooth, palatable ice cream results.

The following is one example of this invention:

Example 1

| | Parts |
|---|---|
| Milk | 2 |
| Cream | 2 |
| Sugar | 1 |
| Sloe gin | 1 |

The sugar is dissolved in the milk and cream and the sloe gin added and beaten thoroughly. It is poured into containers or molds and frozen by means of dry ice.

Another example is as follows:

Example 2

| | Parts |
|---|---|
| Milk | 1.25 |
| Cream | 2.00 |
| Sugar | 1.00 |
| Whiskey | 1.50 |

The various ingredients are mixed together and thoroughly whipped and frozen in a manner similar to Example 1.

A further example:

*Example 3*

| | Parts |
|---|---|
| Milk | 2.00 |
| Cream | 2.00 |
| Sugar | 1.00 |
| Alcohol | 0.75 |
| Flavor and color | 0.10 |

By means of this invention it is possible to decrease the amounts and often entirely eliminate the use of various substances such as gelatins, gums, and other extraneous materials used as stabilizing agents.

Various flavoring agents may be added preferably in the alcohol or spirituous liquors used.

This invention is not to be construed as limited to the above examples. These examples are merely given to illustrate the invention and are not intended to limit its scope. Other beverage liquors or beverage alcohol may be used in place of those mentioned above and the proportions used may be changed materially depending upon the particular formula of the individual ice cream mix.

The alcohol per cent by volume refers to percentage volume of anhydrous ethyl alcohol contained in the frozen confection as compared to the total volume of the air-free or gas-free frozen confection.

I claim:

1. A process of preparing a smooth ice cream which consists in mixing the ingredients of a batch free from stabilizers, adding spirituous beverage liquor in sufficient quantity so that the final product will contain ethyl alcohol in excess of 5% by volume, and in then whipping and then freezing said whipped ingredients.

2. A smooth ice cream free from stabilizing agents which is characterized by the presence of ethyl alcohol in excess of approximately 5% by volume.

3. A smooth ice cream free from stabilizing agents which is characterized by the presence of a spirituous beverage liquor in such quantity that ethyl alcohol is present in said ice cream product in excess of approximately 5% by volume.

AARON LONDON.